(12) United States Patent
Rodeck et al.

(10) Patent No.: US 10,542,016 B2
(45) Date of Patent: Jan. 21, 2020

(54) LOCATION ENRICHMENT IN ENTERPRISE THREAT DETECTION

(71) Applicant: SAP SE, Walldorf (DE)

(72) Inventors: Marco Rodeck, Maikammer (DE); Harish Mehta, Wiesenbach (DE); Hartwig Seifert, Elchesheim-Illingen (DE); Thomas Kunz, Lobbach/Lobenfeld (DE); Eugen Pritzkau, Wiesloch (DE); Wei-Guo Peng, Dallau (DE); Lin Luo, Wiesloch (DE); Rita Merkel, Ilvesheim (DE); Florian Chrosziel, St. Leon-Rot. (DE); Jona Hassforther, Heidelberg (DE); Thorsten Menke, Bad Iburg (DE)

(73) Assignee: SAP SE, Walldorf (DE)

( * ) Notice: Subject to any disclaimer, the term of this patent is extended or adjusted under 35 U.S.C. 154(b) by 118 days.

(21) Appl. No.: 15/253,438

(22) Filed: Aug. 31, 2016

(65) Prior Publication Data
US 2018/0063167 A1    Mar. 1, 2018

(51) Int. Cl.
*H04L 29/06*    (2006.01)
(52) U.S. Cl.
CPC ........ *H04L 63/1416* (2013.01); *H04L 63/083* (2013.01); *H04L 63/108* (2013.01); *H04L 63/1425* (2013.01); *H04L 63/1483* (2013.01)
(58) Field of Classification Search
CPC . H04L 63/1416; H04L 63/083; H04L 63/108; H04L 63/1425; H04L 63/1483
USPC .......................................................... 726/23
See application file for complete search history.

(56) References Cited

U.S. PATENT DOCUMENTS

| | | | |
|---|---|---|---|
| 5,440,726 A | 8/1995 | Fuchs | |
| 5,960,170 A | 9/1999 | Chen | |
| 6,173,418 B1 | 1/2001 | Fujino et al. | |
| 6,629,106 B1 | 9/2003 | Narayanaswamy | |
| 6,779,001 B1 | 8/2004 | Kanai et al. | |
| 7,376,969 B1 | 5/2008 | Njemanze | |
| 7,380,205 B2 | 5/2008 | Bezrukov et al. | |
| 7,441,197 B2 | 10/2008 | Tschiegg et al. | |
| 7,457,792 B2 | 11/2008 | Weigt et al. | |

(Continued)

OTHER PUBLICATIONS

Office Action in related U.S. Appl. No. 15/216,201 dated Mar. 7, 2018; 14 pages.

(Continued)

*Primary Examiner* — Kambiz Zand
*Assistant Examiner* — Mahabub S Ahmed
(74) *Attorney, Agent, or Firm* — Fish & Richardson P.C.

(57) ABSTRACT

Subnet information and location information is received from a database by a smart data streaming engine (SDS). A particular subnet of the subnet information is associated with a particular location of the location information by a globally unique location ID value. Log event data received in the SDS is normalized as normalized log event data. The normalized log event data is enriched with subnet and location information as enriched log event data and written into a log event persistence in the database. A subnet ID value retrieved from an enriched log event of the enriched log event data is used by an enterprise threat detection (ETD) system to determine a location associated with the enriched log event using a location ID value associated with the subnet ID.

20 Claims, 14 Drawing Sheets

(56) References Cited

U.S. PATENT DOCUMENTS

| | | | |
|---|---|---|---|
| 7,457,793 B2 | 11/2008 | Weigt et al. | |
| 7,457,794 B2 | 11/2008 | Weigt et al. | |
| 7,545,969 B2 | 6/2009 | Bennett | |
| 7,624,092 B2 | 11/2009 | Lieske et al. | |
| 7,627,544 B2 | 12/2009 | Chkodrov | |
| 7,756,808 B2 | 7/2010 | Weigt et al. | |
| 7,756,809 B2 | 7/2010 | Weigt et al. | |
| 7,761,396 B2 | 7/2010 | Weigt et al. | |
| 7,783,723 B2 | 8/2010 | Peng et al. | |
| 7,788,718 B1 | 8/2010 | Fei | |
| 7,872,982 B2 * | 1/2011 | Atkins | H04L 41/0631 370/242 |
| 7,908,660 B2 | 3/2011 | Bahl | |
| 7,934,257 B1 | 4/2011 | Kienzle | |
| 7,961,633 B2 | 6/2011 | Shankar | |
| 7,971,209 B2 | 6/2011 | Eberlein et al. | |
| 8,051,034 B2 | 11/2011 | Mehta et al. | |
| 8,091,117 B2 * | 1/2012 | Williams | H04L 41/0853 726/3 |
| 8,474,047 B2 * | 6/2013 | Adelstein | H04L 63/14 713/187 |
| 8,484,726 B1 * | 7/2013 | Sutton | H04L 63/1416 709/224 |
| 8,554,907 B1 | 10/2013 | Chen et al. | |
| 8,661,103 B2 | 2/2014 | Mehta et al. | |
| 8,775,671 B2 | 7/2014 | Rodeck et al. | |
| 8,892,454 B2 | 11/2014 | Rabetge et al. | |
| 8,954,602 B2 | 2/2015 | Seifert et al. | |
| 8,973,147 B2 * | 3/2015 | Pearcy | H04L 41/0893 726/25 |
| 9,037,678 B2 | 5/2015 | Mehta et al. | |
| 9,075,633 B2 | 7/2015 | Nos | |
| 9,106,697 B2 | 8/2015 | Capalik et al. | |
| 9,116,906 B2 | 8/2015 | Nos et al. | |
| 9,148,488 B2 | 9/2015 | Rabetge et al. | |
| 9,170,951 B1 * | 10/2015 | He | G06F 12/0844 |
| 9,251,011 B2 | 2/2016 | Meier et al. | |
| 9,262,519 B1 * | 2/2016 | Saurabh | G06F 16/285 |
| 9,304,978 B2 | 4/2016 | Bezrukov et al. | |
| 9,313,421 B2 | 4/2016 | Deshpande | |
| 9,336,385 B1 | 5/2016 | Spencer | |
| 9,348,665 B2 | 5/2016 | Storz et al. | |
| 9,383,934 B1 | 7/2016 | Likacs | |
| 9,419,989 B2 | 8/2016 | Harris | |
| 9,524,389 B1 | 12/2016 | Roth | |
| 9,619,984 B2 * | 4/2017 | Donovan | G08B 13/19645 |
| 9,690,931 B1 | 6/2017 | Anantharaju et al. | |
| 9,779,147 B1 | 10/2017 | Sherman et al. | |
| 9,843,596 B1 | 12/2017 | Avelbuch | |
| 9,979,741 B2 | 5/2018 | Fehrman | |
| 10,001,389 B1 | 6/2018 | Das et al. | |
| 10,079,842 B1 | 9/2018 | Brandwine et al. | |
| 10,102,379 B1 | 10/2018 | Seifert et al. | |
| 10,140,447 B2 | 11/2018 | Rahaman et al. | |
| 10,148,675 B1 | 12/2018 | Brandwine et al. | |
| 2002/0070953 A1 | 6/2002 | Barg | |
| 2003/0074471 A1 * | 4/2003 | Anderson | H04L 29/12009 709/245 |
| 2003/0115484 A1 | 6/2003 | Mariconi et al. | |
| 2003/0217137 A1 * | 11/2003 | Roese | G01S 5/02 709/223 |
| 2004/0044912 A1 * | 3/2004 | Connary | H04L 43/045 726/23 |
| 2004/0078490 A1 * | 4/2004 | Anderson | H04L 29/12009 709/245 |
| 2004/0093513 A1 * | 5/2004 | Cantrell | H04L 43/00 726/23 |
| 2006/0037075 A1 | 2/2006 | Frattura | |
| 2006/0059115 A1 | 3/2006 | Gulfleisch et al. | |
| 2006/0161816 A1 | 7/2006 | Gula et al. | |
| 2006/0253907 A1 * | 11/2006 | McConnell | G06F 21/554 726/23 |
| 2007/0067438 A1 | 3/2007 | Goranson et al. | |
| 2007/0073519 A1 | 3/2007 | Long | |
| 2007/0100905 A1 | 5/2007 | Masters et al. | |
| 2007/0115998 A1 * | 5/2007 | McElligott | H04L 45/02 370/392 |
| 2007/0136437 A1 | 6/2007 | Shankar et al. | |
| 2007/0150596 A1 | 6/2007 | Miller et al. | |
| 2007/0183389 A1 * | 8/2007 | Clee | G06F 3/0481 370/347 |
| 2007/0186284 A1 * | 8/2007 | McConnell | G06F 21/55 726/25 |
| 2007/0266387 A1 | 11/2007 | Henmi | |
| 2007/0283192 A1 | 12/2007 | Shevchenko | |
| 2007/0300296 A1 * | 12/2007 | Kudla | H04L 63/0263 726/13 |
| 2008/0033966 A1 | 2/2008 | Wahl | |
| 2008/0034425 A1 | 2/2008 | Overcash et al. | |
| 2008/0080384 A1 * | 4/2008 | Atkins | H04L 41/0631 370/252 |
| 2008/0091681 A1 * | 4/2008 | Dwivedi | G06F 21/31 |
| 2008/0295173 A1 | 11/2008 | Tsvetanov | |
| 2008/0320552 A1 * | 12/2008 | Kumar | G06F 21/552 726/1 |
| 2009/0044277 A1 | 2/2009 | Aaron et al. | |
| 2009/0049518 A1 | 2/2009 | Roman | |
| 2009/0288164 A1 | 11/2009 | Adelstein | |
| 2009/0293046 A1 | 11/2009 | Cheriton | |
| 2009/0300045 A1 | 12/2009 | Chaudhry et al. | |
| 2009/0312026 A1 * | 12/2009 | Parameswar | H04W 4/02 455/445 |
| 2010/0011031 A1 * | 1/2010 | Huang | G06F 21/552 707/E17.007 |
| 2010/0114832 A1 | 5/2010 | Lillibridge | |
| 2010/0180325 A1 * | 7/2010 | Golobay | H04L 63/20 726/6 |
| 2011/0213741 A1 * | 9/2011 | Shama | G06Q 30/02 706/13 |
| 2011/0277034 A1 | 11/2011 | Hanson | |
| 2011/0320816 A1 | 12/2011 | Yao | |
| 2012/0005542 A1 * | 1/2012 | Petersen | G06F 11/0709 714/48 |
| 2012/0158653 A1 | 6/2012 | Shaffer et al. | |
| 2012/0167161 A1 | 6/2012 | Kim et al. | |
| 2012/0191660 A1 | 7/2012 | Hoog | |
| 2012/0210434 A1 | 8/2012 | Curtis et al. | |
| 2012/0271790 A1 | 10/2012 | Lappas et al. | |
| 2012/0317078 A1 | 12/2012 | Zhou et al. | |
| 2013/0086023 A1 | 4/2013 | Tsukamoto et al. | |
| 2013/0106830 A1 | 5/2013 | de Loera | |
| 2013/0198840 A1 | 8/2013 | Drissi et al. | |
| 2013/0212709 A1 | 8/2013 | Tucker | |
| 2013/0262311 A1 * | 10/2013 | Buhrmann | G06Q 20/40 705/44 |
| 2013/0298243 A1 | 11/2013 | Kumar et al. | |
| 2013/0304665 A1 | 11/2013 | Rodeck et al. | |
| 2013/0304666 A1 | 11/2013 | Rodeck et al. | |
| 2013/0305369 A1 * | 11/2013 | Karta | H04L 63/1416 726/23 |
| 2013/0326079 A1 | 12/2013 | Seifert et al. | |
| 2013/0347111 A1 | 12/2013 | Karta | |
| 2014/0047413 A1 | 2/2014 | Sheive et al. | |
| 2014/0201836 A1 * | 7/2014 | Amsler | H04L 63/1425 726/23 |
| 2014/0223283 A1 | 8/2014 | Hancock | G01C 21/32 715/234 |
| 2014/0244623 A1 | 8/2014 | King | |
| 2014/0317681 A1 | 10/2014 | Shende | |
| 2015/0007325 A1 | 1/2015 | Eliseev | |
| 2015/0067880 A1 * | 3/2015 | Ward | G06F 21/6245 726/26 |
| 2015/0106867 A1 * | 4/2015 | Liang | H04L 63/1433 726/1 |
| 2015/0143521 A1 | 5/2015 | Eliseev | |
| 2015/0154524 A1 * | 6/2015 | Borodow | G06Q 10/06313 705/7.23 |
| 2015/0180891 A1 * | 6/2015 | Seward | H04L 63/1416 726/22 |
| 2015/0215329 A1 | 7/2015 | Singla | |

(56) References Cited

U.S. PATENT DOCUMENTS

| | | |
|---|---|---|
| 2015/0237065 A1* | 8/2015 | Roytman .......... H04L 63/1433 726/25 |
| 2015/0264011 A1* | 9/2015 | Liang .......... H04L 63/0209 726/11 |
| 2015/0278371 A1 | 10/2015 | Anand |
| 2015/0281278 A1* | 10/2015 | Gooding .......... H04L 63/20 726/1 |
| 2015/0319185 A1 | 11/2015 | Kirti |
| 2015/0341389 A1* | 11/2015 | Kurakami .......... H04L 63/20 726/1 |
| 2015/0347751 A1 | 12/2015 | Card et al. |
| 2015/0355957 A1 | 12/2015 | Steiner |
| 2015/0358344 A1 | 12/2015 | Mumcuoglu |
| 2015/0381646 A1 | 12/2015 | Lin |
| 2016/0057166 A1 | 2/2016 | Chesla |
| 2016/0057167 A1 | 2/2016 | Bach et al. |
| 2016/0065594 A1 | 3/2016 | Srivastava et al. |
| 2016/0092535 A1 | 3/2016 | Kuchibhotla et al. |
| 2016/0127391 A1 | 5/2016 | Kobres |
| 2016/0164891 A1* | 6/2016 | Satish .......... G06F 16/285 726/1 |
| 2016/0202893 A1 | 7/2016 | Mustonen et al. |
| 2016/0226905 A1 | 8/2016 | Baikalov et al. |
| 2016/0248798 A1 | 8/2016 | Cabrera et al. |
| 2016/0291982 A1 | 10/2016 | Mizrahi |
| 2016/0292061 A1 | 10/2016 | Marron |
| 2016/0337384 A1 | 11/2016 | Jansson |
| 2016/0359886 A1 | 12/2016 | Yadav et al. |
| 2016/0364315 A1 | 12/2016 | Lee |
| 2016/0364571 A1 | 12/2016 | Lee |
| 2016/0373476 A1 | 12/2016 | Dell'anno et al. |
| 2016/0378978 A1 | 12/2016 | Singla |
| 2016/0381049 A1* | 12/2016 | Lakhani .......... H04L 63/1416 726/23 |
| 2017/0004005 A1 | 1/2017 | Elliott |
| 2017/0026400 A1 | 1/2017 | Adams et al. |
| 2017/0031002 A1 | 2/2017 | Newton et al. |
| 2017/0034023 A1 | 2/2017 | Nickolov |
| 2017/0070415 A1 | 3/2017 | Bell et al. |
| 2017/0091008 A1 | 3/2017 | Cherbakov |
| 2017/0093902 A1 | 3/2017 | Roundy et al. |
| 2017/0148060 A1* | 5/2017 | Showers .......... G06Q 30/02 |
| 2017/0169217 A1 | 6/2017 | Rahaman |
| 2017/0251365 A1* | 8/2017 | Burchardt .......... H04B 10/116 |
| 2017/0270006 A1 | 9/2017 | Kankylas |
| 2017/0279837 A1* | 9/2017 | Dasgupta .......... H04L 45/00 |
| 2017/0287179 A1 | 10/2017 | Tibshirani et al. |
| 2017/0302685 A1 | 10/2017 | Ladnai et al. |
| 2017/0308602 A1 | 10/2017 | Raghunathan et al. |
| 2017/0310690 A1* | 10/2017 | Mestha .......... H04L 63/1425 |
| 2017/0316026 A1 | 11/2017 | Kanthak et al. |
| 2017/0322993 A1 | 11/2017 | Brodt et al. |
| 2017/0324766 A1 | 11/2017 | Gonzalez |
| 2018/0027002 A1 | 1/2018 | Rodeck et al. |
| 2018/0027010 A1 | 1/2018 | Pritzkau et al. |
| 2018/0059876 A1 | 3/2018 | Peng et al. |
| 2018/0091535 A1 | 3/2018 | Chrosziel |
| 2018/0091536 A1 | 3/2018 | Chrosziel et al. |
| 2018/0157835 A1 | 6/2018 | Nos |
| 2018/0173872 A1 | 6/2018 | Lam et al. |
| 2018/0173873 A1 | 6/2018 | Hassforther et al. |
| 2018/0176234 A1 | 6/2018 | Kunz et al. |
| 2018/0176235 A1 | 6/2018 | Lam et al. |
| 2018/0176238 A1 | 6/2018 | Nos et al. |
| 2018/0234447 A1 | 8/2018 | Mueen |
| 2019/0005423 A1 | 1/2019 | Pritzkau et al. |
| 2019/0007435 A1 | 1/2019 | Pritzkau et al. |

OTHER PUBLICATIONS

Office Action in related U.S. Appl. No. 15/274,569 dated Apr. 16, 2018; 11 pages.
U.S. Office Action in related U.S. Appl. No. 15/274,569 dated Nov. 14, 2018, 11 pages.
U.S. Office Action in related U.S. Appl. No. 15/274,693 dated Feb. 11, 2019, 13 pages.
U.S. Office Action in related U.S. Appl. No. 15/274,693 dated Jul. 26, 2018, 14 pages.
U.S. Office Action in related U.S. Appl. No. 15/216201 dated Jul. 20, 2018, 15 pages.
U.S. Office Action in related U.S. Appl. No. 15/246,053 dated May 21, 2018, 14 pages.
U.S. Office Action in related U.S. Appl. No. 15/246,053 dated Sep. 24, 2018, 14 pages.
U.S. Office Action in related U.S. Appl. No. 15/370,084 dated Aug. 27, 2018, 14 pages.
U.S. Office Action in related U.S. Appl. No. 15/370,084 dated Feb. 4, 2019, 9 pages.
U.S. Office Action in related U.S. Appl. No. 15/380,450 dated Aug. 27, 2018, 19 pages.
U.S. Office Action in related U.S. Appl. No. 15/380,450 dated Jan. 23, 2019, 21 pages.
U.S. Office Action in related U.S. Appl. No. 15/380,450 dated Nov. 2, 2018, 19 pages.
U.S. Office Action in related U.S. Appl. No. 15/380,379 dated Jul. 19, 2018, 9 pages.
U.S. Office Action in related U.S. Appl. No. 15/381,567 dated Nov. 2, 2018, 17 pages.
U.S. Office Action in related U.S. Appl. No. 15/383,771 dated Aug. 3, 2018, 12 pages.
U.S. Office Action in related U.S. Appl. No. 15/383,771 dated Jan. 23, 2019, 14 pages.
Schumacher, "An effective way to bring SAP Security Notes under control," Virtual Forge GmbH, Feb. 2017, https://blog.virtualforge.com/en/an-effective-way-to-bring-sap-security-notes-under-control, 4 pages.
Non-Final Office Action issued in U.S. Appl. No. 15/274,569 dated Mar. 22, 2019, 11 pages.
Office Action issued in U.S. Appl. No. 15/847,478, dated Aug. 6, 2019, 36 pages.
Office Action issued in U.S. Appl. No. 15/216,046 dated Aug. 21, 2019, 23 pages.
Final Office Action issued in U.S. Appl. No. 15/381,567 dated May 22, 2019, 28 pages.
Non-Final Office Action issued in U.S. Appl. No. 15/216,046 dated Apr. 29, 2019, 23 pages.
Non-Final Office Action issued in U.S. Appl. No. 15/246,053 dated May 17, 2019, 28 pages.
Non-Final Office Action issued in U.S. Appl. No. 15/639,863 dated Jun. 24, 2019, 37 pages.
U.S. Office Action in related U.S. Appl. No. 15/383,771 dated Jul. 5, 2019, 16 pages.

* cited by examiner

Enterprise Threat Detection: Subnets Overview

SUBNET OVERVIEW    GENERAL

Subnet Mask 255.255.255.0

19.10.192.0 — 704

💾 Save changes   ⟲ Reset changes

General — 702

| | |
|---|---|
| Network Address: | 19.10.192.0 |
| Subnet Mask: | 255.255.255.0 |
| Description: | Office Network Walldorf |
| Location: | Walldorf |
| Category: | Office Network |

Business Significance

| | |
|---|---|
| Confidentiality: | Medium |
| Integrity System: | Medium |
| Integrity Data: | High |
| Availability: | High |

LOCATION ENRICHMENT IN ENTERPRISE THREAT DETECTION

BACKGROUND

Enterprise threat detection (ETD) typically collects and stores a large amount of log data from various systems associated with an enterprise computing system. The collected log data is usually analyzed using forensic-type data analysis tools to identify suspicious behavior and to allow an appropriate response. While the log data contains information such as transient Internet Protocol (IP) addresses or system information, an IP address or system information in a log entry does not specifically provide information of a geographic location where the logged event occurred. This missing geographic data is extremely useful in enterprise threat detection analysis.

Additionally, transient data, such as IP addresses, can have a lifetime shorter than a time period under ETD investigation. Using such transient data in ETD can result in incomplete or erroneous analysis results.

SUMMARY

The present disclosure describes methods and systems, including computer-implemented methods, computer program products, and computer systems for location enrichment in enterprise threat detection (ETD).

In an implementation, subnet information and location information is received from a database by a smart data streaming engine (SDS). A particular subnet of the subnet information is associated with a particular location of the location information by a globally unique location ID value. Log event data received in the SDS is normalized as normalized log event data. The normalized log event data is enriched with subnet and location information as enriched log event data and written into a log event persistence in the database. A subnet ID value retrieved from an enriched log event of the enriched log event data is used by an enterprise threat detection (ETD) system to determine a location associated with the enriched log event using a location ID value associated with the subnet ID.

The above-described implementation is implementable using a computer-implemented method; a non-transitory, computer-readable medium storing computer-readable instructions to perform the computer-implemented method; and a computer-implemented system comprising a computer memory interoperably coupled with a hardware processor configured to perform the computer-implemented method/ the instructions stored on the non-transitory, computer-readable medium.

The subject matter described in this specification can be implemented in particular implementations so as to realize one or more of the following advantages. First, the described subject matter permits the showing of log events based on a location where the events happened. Second, communications between different locations can be shown. Third, a current network configuration can be shown and a comparison made to a planned network configuration is possible. Fourth, actions associated with a user can be illustrated on a geographic map. This allows, for example, discovery of user password/data sharing and successful phishing attacks (where a user logs on from different locations with large distances in between the locations). Fifth, events, alerts, investigations, etc. can be identified based on locations. For example, how many activities are occurring in a particular location(s) can help determine possible network misconfigurations/attacks. Other advantages will be apparent to those of ordinary skill in the art.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

FIG. 7 is a screenshot of a subnet details GUI used to maintain details of a particular subnet, according to an implementation.

FIG. 9 is a screenshot of a system details GUI used to maintain details of a particular system, according to an implementation.

Like reference numbers and designations in the various drawings indicate like elements.

DETAILED DESCRIPTION

Figure 1:
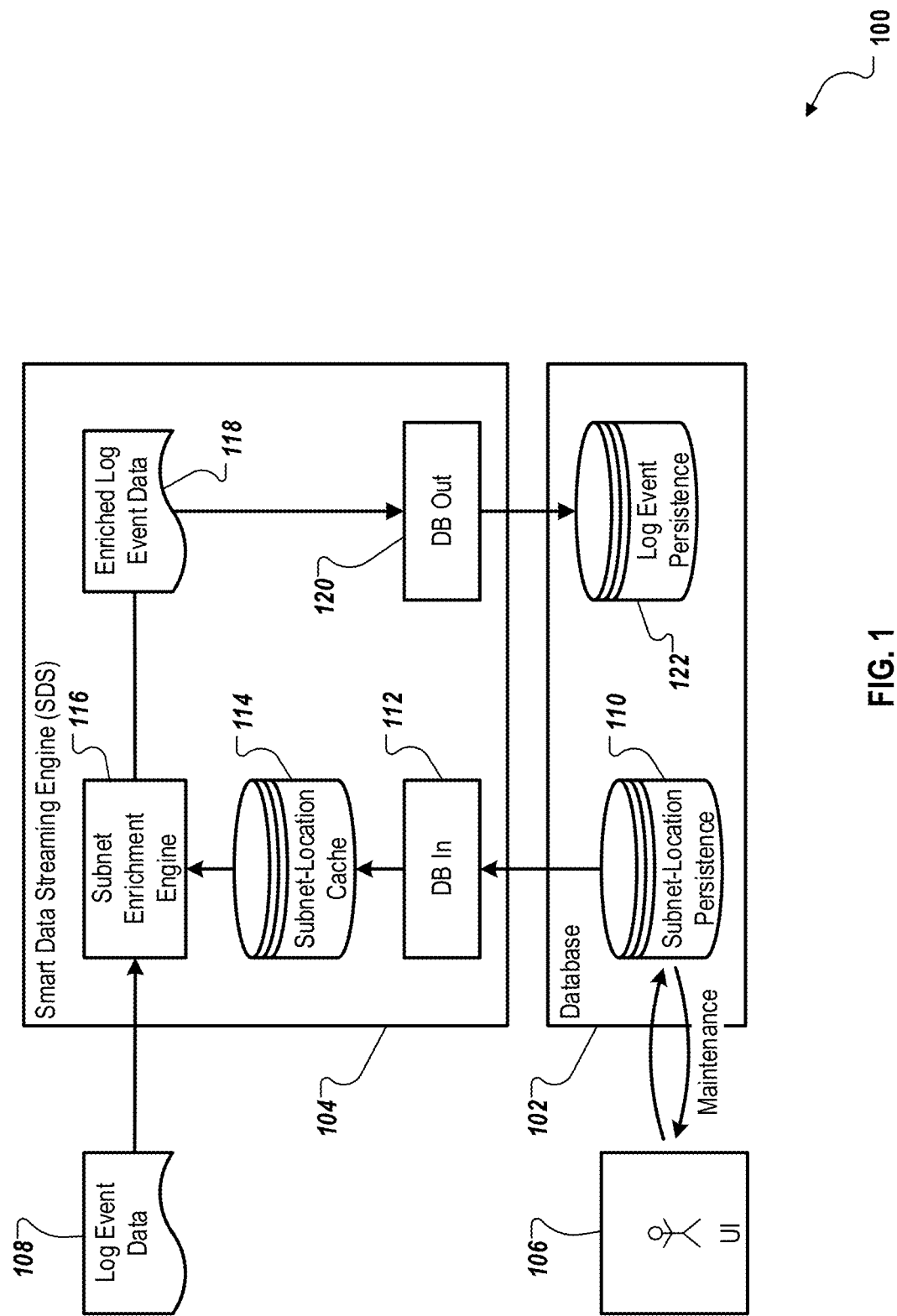
FIG. 1 is a block diagram of an example system used for location enrichment in enterprise threat detection, according to an implementation.

The following detailed description describes for location enrichment in enterprise threat detection (ETD) and is presented to enable any person skilled in the art to make and use the disclosed subject matter in the context of one or more particular implementations. Various modifications to the disclosed implementations will be readily apparent to those skilled in the art, and the general principles defined herein may be applied to other implementations and applications without departing from scope of the disclosure. Thus, the present disclosure is not intended to be limited to the described or illustrated implementations, but is to be accorded the widest scope consistent with the principles and features disclosed herein.

Enterprise threat detection typically collects and stores a large amount of log data from various systems associated with an enterprise computing system. The collected log data is usually analyzed using forensic-type data analysis tools to identify suspicious behavior and to allow an appropriate response. While the log data contains information such as Internet Protocol (IP) addresses or system information, an IP address or system information in a log entry does not specifically provide information of a geographic location (hereinafter "geo-location") where the logged event occurred. This missing geographic data is extremely useful in analysis of certain enterprise threat detection use cases. For example, a user logs on to a computing system using a client with a certain IP address which is located in Europe. A few seconds later, the same user passes an access control system at a location in the United States. If the two events are correlated only with user information, a threat is not readily apparent. However, when geo-location is considered, the event should be elevated for further analysis due to various possible use cases, some of which could be malicious. For example, the user could not realistically travel from Europe to the United States in a matter of seconds, so details around the European and United States logins should be analyzed in more detail. While the distant login may be innocent (for example, a legitimate remote desktop or other remote-type login to download or access data, assist a user on the other computer, etc.), questions to explore can include, where is the user geographically located? What systems were accessed and for what purpose? Was the access to the remote computer from a computer assigned to the user or using a user ID/password of the user from a different computer? Is the user authorized to perform remote logins to other computers?

Described is the enrichment of network subnet information with IP address information. Subnets and systems known to an ETD system can also be assigned to a location which contains a geo-location object. Enrichment of networks with the described IP address, location, and geo-location information will permit log events to be analyzed on the basis of locations and calculations related to the different locations (for example, distance, time to travel, operations and actions over a distance, etc.) can be calculated and used for various ETD patterns which include, for example, one or more defined evaluations with specified methods, data types/values, time frames, and the like.

Additionally, transient data, such as IP addresses, can have a lifetime shorter than a time period under ETD investigation. Using such transient data in ETD can result in incomplete or erroneous analysis results. Instead stable and reliable information is required which allows correlation of log event data containing different IP Addresses but refers to the same subnet (and same subnet location). In a typical implementation, subnets are stored in the ETD system as master data. From an IP address with knowledge of all IP subnets, a subnet of a particular IP address in a log entry can be determined. A subnet identifier (ID) is then determined and the log event is enriched with the subnet ID. As mentioned above, subnets can be assigned with location information which carries geo-location and semantical description (for example, buildings, particular rooms, etc.) information. ETD functionality is then enhanced to allow search and browsing for log events by location attributes (for example geo-location or other attributes of the location object such as a computing center name, office building, assigned office, etc.).

FIG. 1 is a block diagram of an example system 100 used for location enrichment in enterprise threat detection, according to an implementation. At a high-level, the system 100 includes a database 102 and smart data streaming engine (SDS) 104. The database 102 is maintained by users 106. In some implementations, the users 106 can include automated processes, other databases, etc. The SDS 104 receives log event data 108.

In the database 102, a subnet-location persistence 110 maintains a list of subnets (for example, a network address, subnet mask, subnet ID). The subnet-location persistence 110 also maintains one or more geo-location objects storing location-associated data. In typical implementations, a geo-location object includes:

Id binary, globally unique identifier,
Location textual description such as name of building, city, office code etc.,
Parent Location binary, global unique id of the parent location (locations can be maintained in a hierarchical composition),
Description additional long text for a location,
Type Type of location: office, floor, section, building, site, city, country, etc., and
Longitude, Latitude Geolocation information.

Each geo-location is associated with a location ID. The location ID is can be maintained with both subnets and system using the location ID in subnet/system database objects. Using the location ID, a particular geo-location object (and associated data) can be accessed.

Once ETD functionality is deployed (for example using a deployment unit—not illustrated) on a system, information from the subnet-location persistence 110 is read from the subnet-location persistence 110 and written into a subnet-location cache 114 of the SDS 104 using an SDS database in adapter 112. The SDS database in adaptor 112 couples the database 102 and the SDS 104. In some implementations, the SDS database in adaptor 112 can be configured for fast database retrieval/storage. Information is typically held in the subnet-location cache 114 in the form of a dictionary table and a vector so that enrichment of log event data 108 can be performed quickly and without delay. At this point, the SDS 104 is ready to enrich log event data 108 using a subnet enrichment engine 116 able to access data from the subnet-location cache 114.

The log event data 108 is typically read at regular intervals (for example, periodically) so that updates/maintenance of subnet information in the subnet-location persistence 110 is respected. In other implementations, a PUSH or PULL (or both) operation can be used so that the subnet enrichment engine 116 receives the log event data 108.

Log event data 108 entering the SDS 104 is normalized into a consistent format (for example, by the subnet enrichment engine 116 or other component (whether or not illustrated) or a combination of elements). For example, the data can be normalized into a consistent format for use by some or all components of the ETD system, such as databases, graphical user interfaces (GUIs), etc.

The subnet enrichment engine 116 then enriches the log event data 108. Enrichment typically includes looking at all subnet masks (for example, closest mask first), applying, for example, a 'bitand' operation (or other operation) between each IP token and subnet mask token, and a searching for a suitable network address with the help of the calculated 'bitand' (or other operation) result. Typically, this process continues for all the subnet masks maintained in the subnet-location persistence 110 until a suitable network address (and associated subnet ID) is identified. The result of this process (the identified subnet ID value) is stored with the event log data 108 as enriched log event data 118. As detailed below, a location ID value can be associated with the subnet ID value to permit determination of a particular location associated with the subnet ID value.

The enriched log event data 118 is written to a log event persistence 122 of the database 102 using an SDS database out adapter 120 configured for fast database storage. The SDS database out adaptor 120 couples the SDS 104 and the database 102. In some implementations, the SDS database out adapter 120 and the SDS database in adapter 112 can be the same component performing both in/out database functions.

When the enriched log event data 118 is later retrieved from the log event persistence 122, the associated subnet ID information can be used to determine a location the event occurred (for example, from which building, floor, or room the event was produced in).

Figure 2:
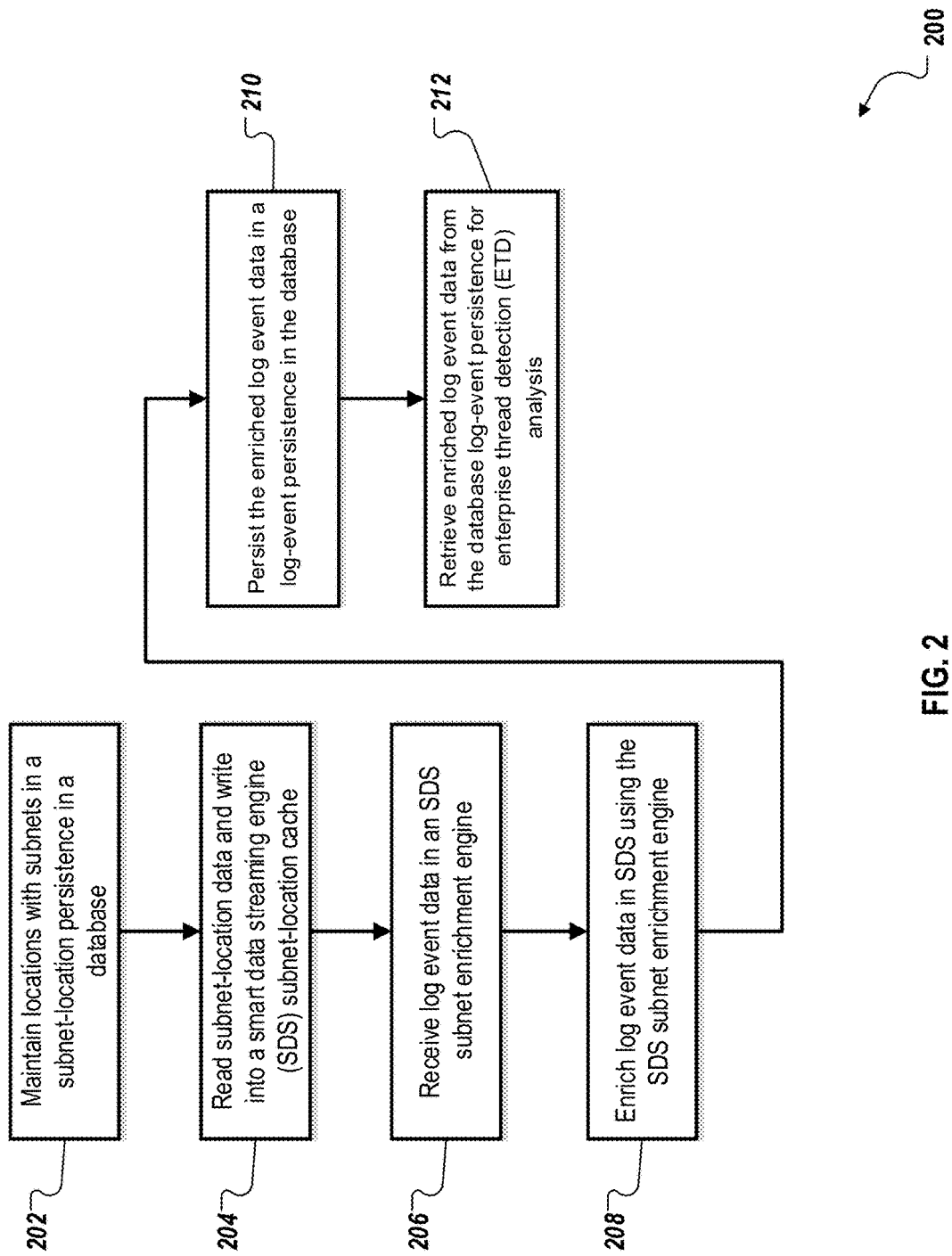
FIG. 2 is a flowchart of an example method for enriching networks with location information, according to an implementation.

FIG. 2 is a flowchart of an example method 200 for enriching networks with location information, according to an implementation. For clarity of presentation, the description that follows generally describes method 200 in the context of the other figures in this description. However, it will be understood that method 200 may be performed, for example, by any suitable system, environment, software, and hardware, or a combination of systems, environments, software, and hardware as appropriate. In some implementations, various steps of method 200 can be run in parallel, in combination, in loops, or in any order.

At 202, locations are maintained in a database with subnet information. The data is stored in a subnet-location persistence. For example, users can access the database using a GUI application to perform the maintenance. From 202, method 200 proceeds to 204.

At 204, subnet-location data is read from the database and written into a smart data streaming engine (SDS) subnet-location cache. From 204, method 200 proceeds to 206.

At 206, log event data is received by an SDS subnet enrichment engine. The received log event data is normalized into a standard format for use by components of the ETD system. From 206, method 200 proceeds to 208.

At 208, the received log event data is enriched by the SDS subnet enrichment engine using data read from the subnet-location cache and saved as enriched log event data. From 208, method 200 proceeds to 210.

At 210, the enriched log event data is persisted in the database by writing the enriched log event data into a log event persistence in the database. From 210, method 200 proceeds to 212.

At 212, an enriched log event of the enriched log event data is retrieved from the log event persistence for ETD analysis. Using the enriched log event, a subnet ID value associated with the enriched log event (due to the enrichment) can be retrieved and used to determine a particular location that the event occurred using the location ID value associated with the subnet ID value. After 212, method 200 stops.

Figure 3:
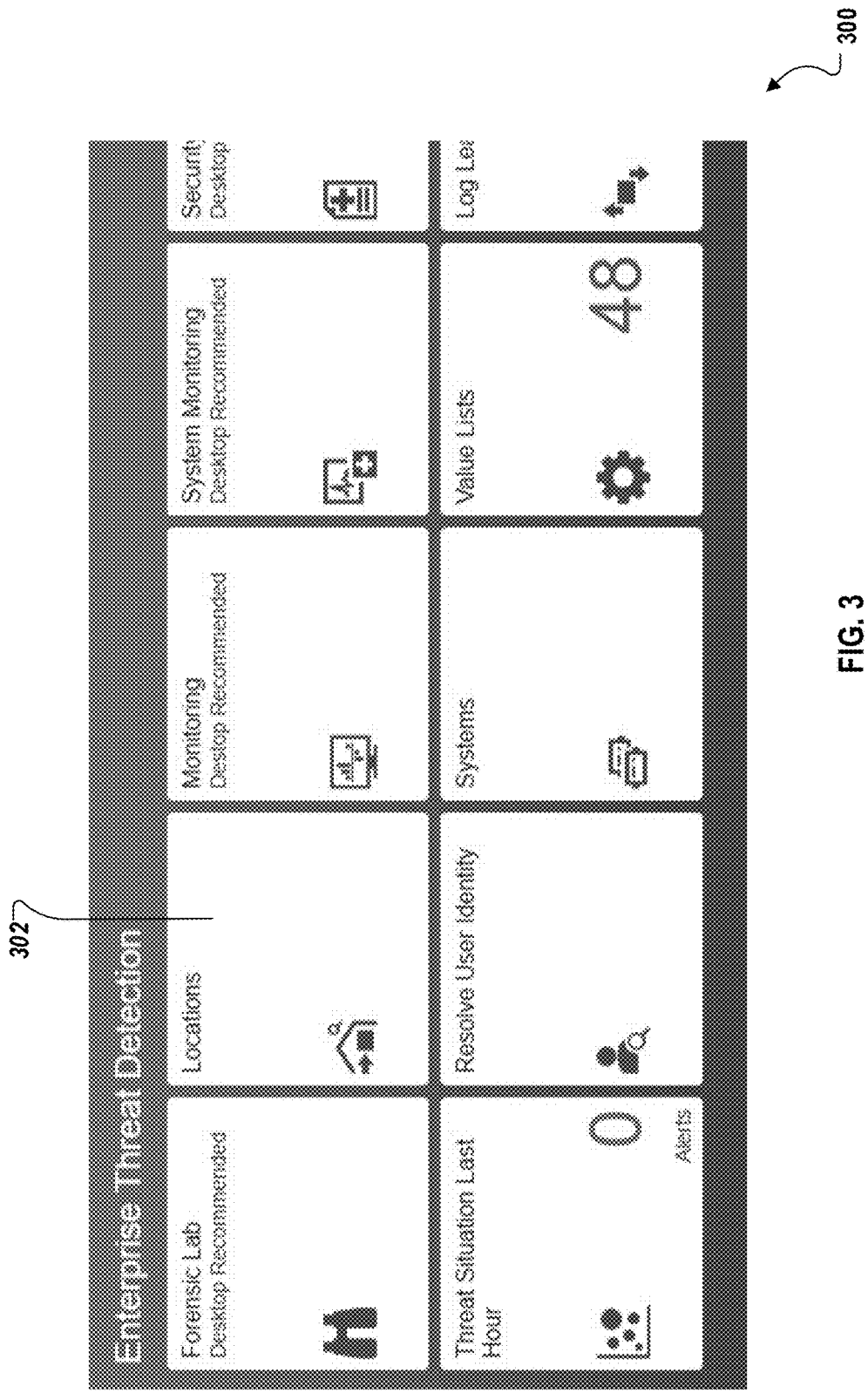
FIG. 3 is a screenshot of an upper level enterprise threat detection main group graphical user interface (GUI), according to an implementation.

FIG. 3 is a screenshot of an upper level enterprise threat detection main group graphical user interface 300, according to an implementation. For example, the user can select the "Location" tile 302 to access ETD location functionality.

Figure 4:
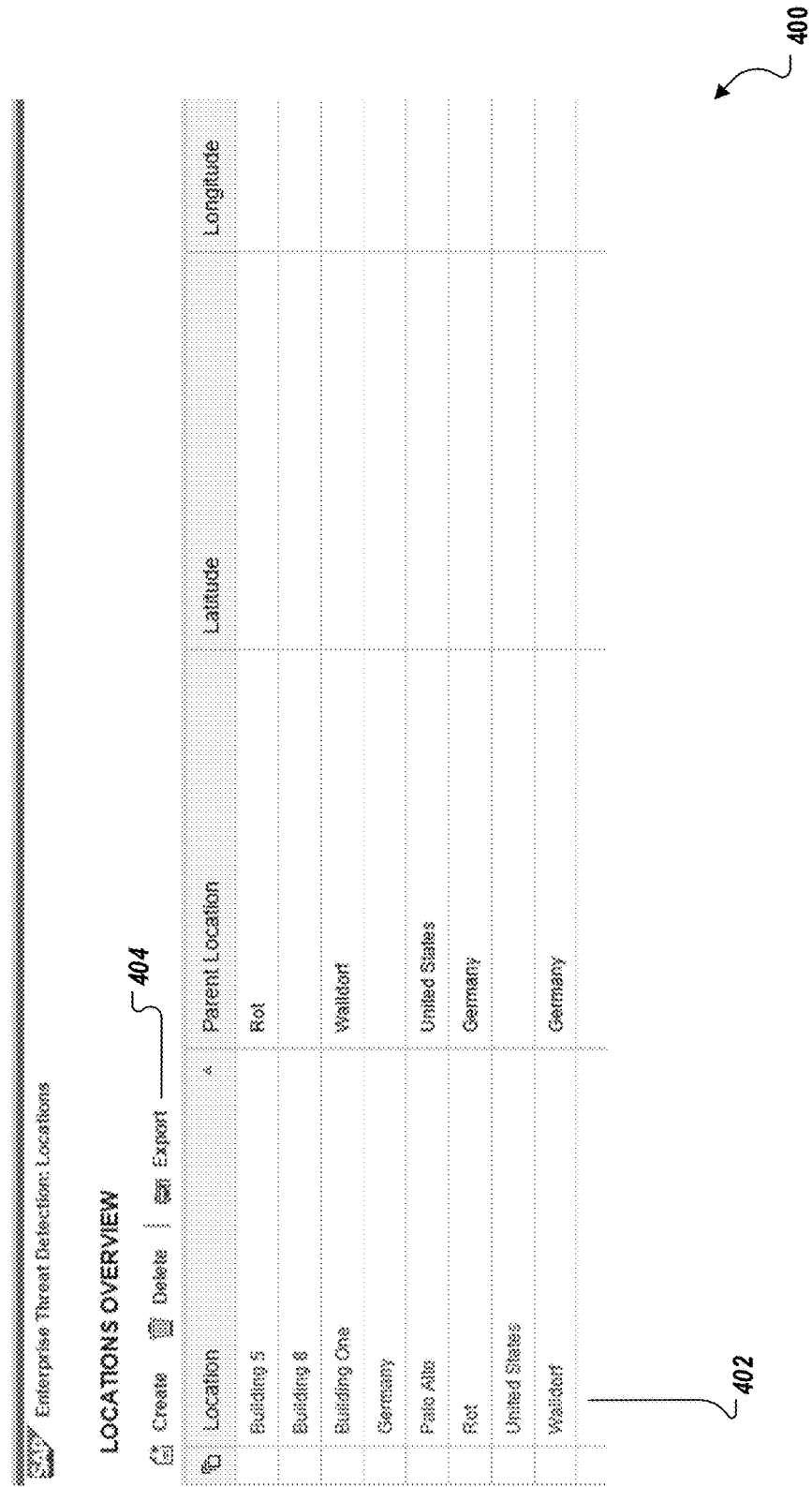
FIG. 4 is a screenshot of location GUI to maintain locations in the database, according to an implementation.

FIG. 4 is a screenshot of location GUI 400 to maintain locations in the database, according to an implementation. As illustrated, existing locations 402 (and some of the associated location details described in FIG. 5) is displayed. The location GUI 400 allows users to, for example, add, delete, or export locations (404). Selecting a location name link in the existing locations 402 navigates a user to a location details GUI.

Figure 5:
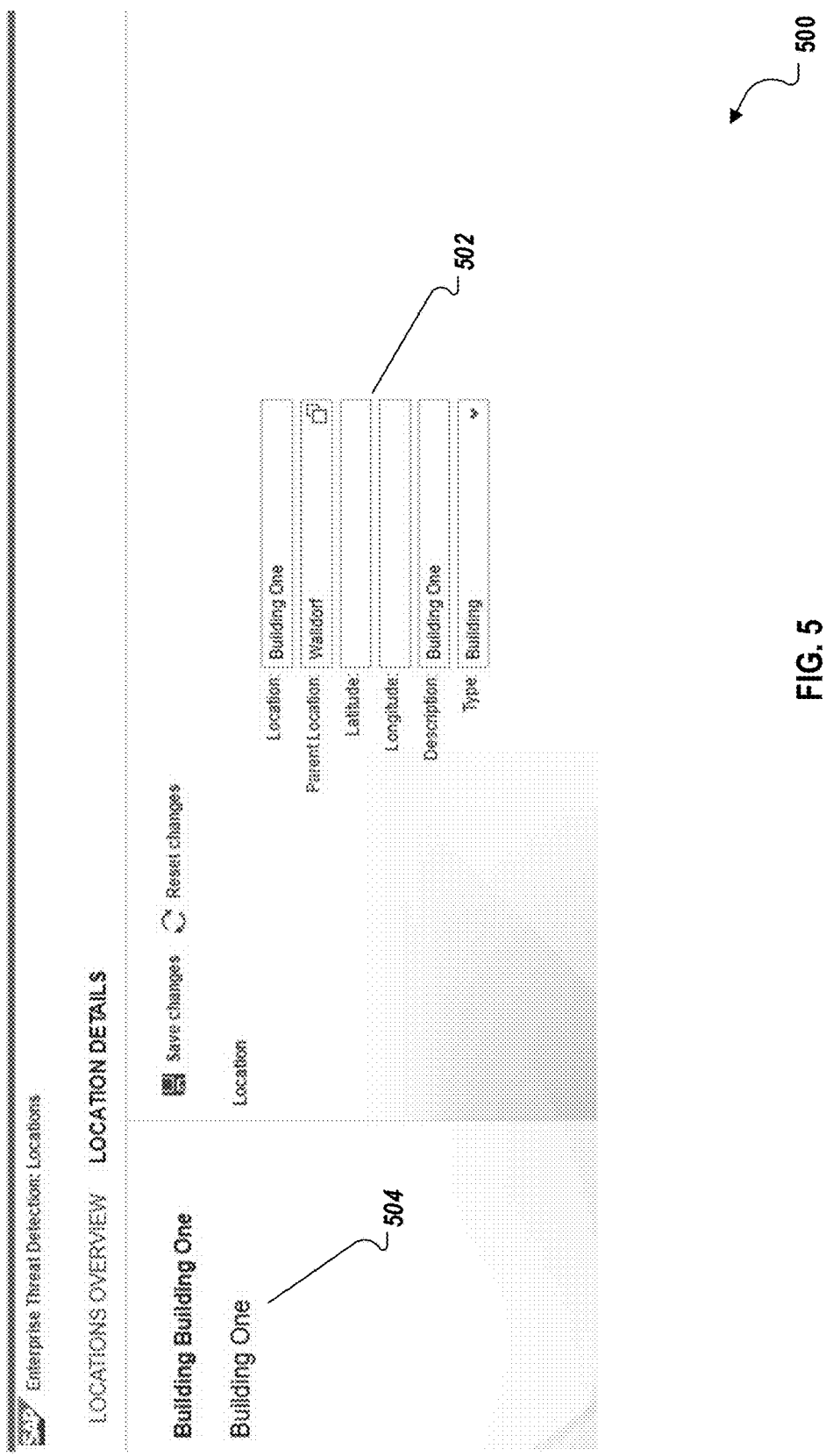
FIG. 5 is a screenshot of a location details GUI used to maintain details of a particular location, according to an implementation.

FIG. 5 is a screenshot of a location details GUI 500 used to maintain details of a particular location, according to an implementation. As illustrated, various GUI elements 502 are provided allow a user to specify details of a selected location (for example, "Building One" 504). Details GUI 500 illustrates fields such as a location name, a parent location, geo-location (for example, latitude and longitude), description, and location type. For example, location type can include selections such as "Building," "Continent," "Region," "Country," "State," "City," "Street," "Section," "Floor," and "Room." These example details are for illustration only. In other implementations, fewer, more, or other details can be configured by a user for a particular location.

In typical implementations, locations can be associated to subnets and systems.

Figure 6:
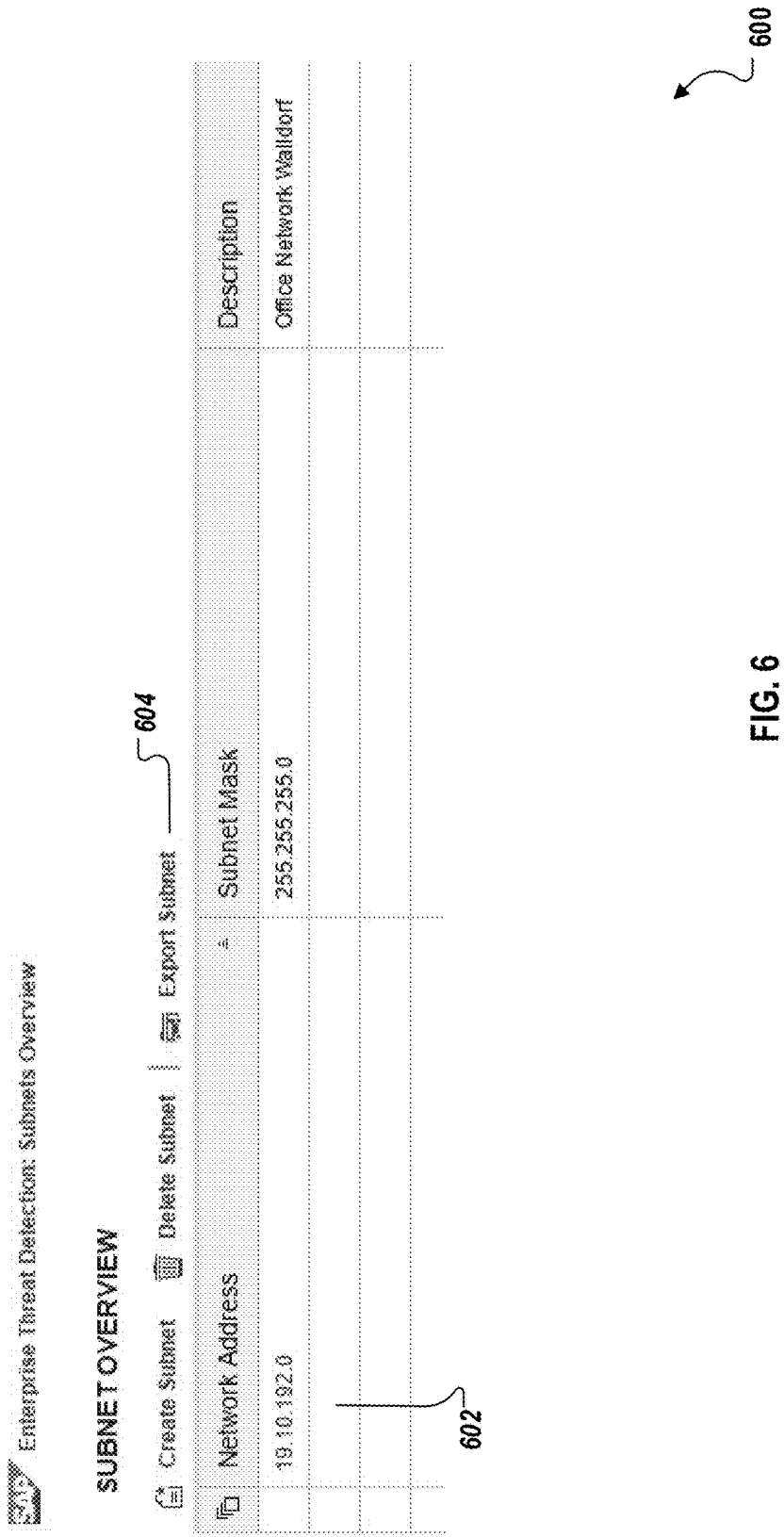
FIG. 6 is a screenshot of subnet GUI to maintain subnets in the database, according to an implementation.

FIG. 6 is a screenshot of subnet GUI 600 to maintain subnets in the database, according to an implementation. The illustrated subnets 602 (and some of the associated subnet details described in FIG. 7) are the result of filtering on subnets having a location maintained. The subnet GUI 600 allows users to, for example, add, delete, or export subnets (604). Selecting a subnet link (for example, subnet "19.10.192.0") in the existing subnets 602 navigates a user to a subnet details GUI.

FIG. 7 is a screenshot of a subnet details GUI 700 used to maintain details of a particular subnet, according to an implementation. As illustrated, various GUI elements 702 are provided allow a user to specify details (including a location) of a selected subnet (here subnet "19.10.192.0"). These example details are for illustration only. In other implementations, fewer, more, or other details can be configured by a user for a particular subnet. For example, additional details not displayed could include a technical contact name, technical contact telephone number, and a technical contact e-mail address.

Figure 8:
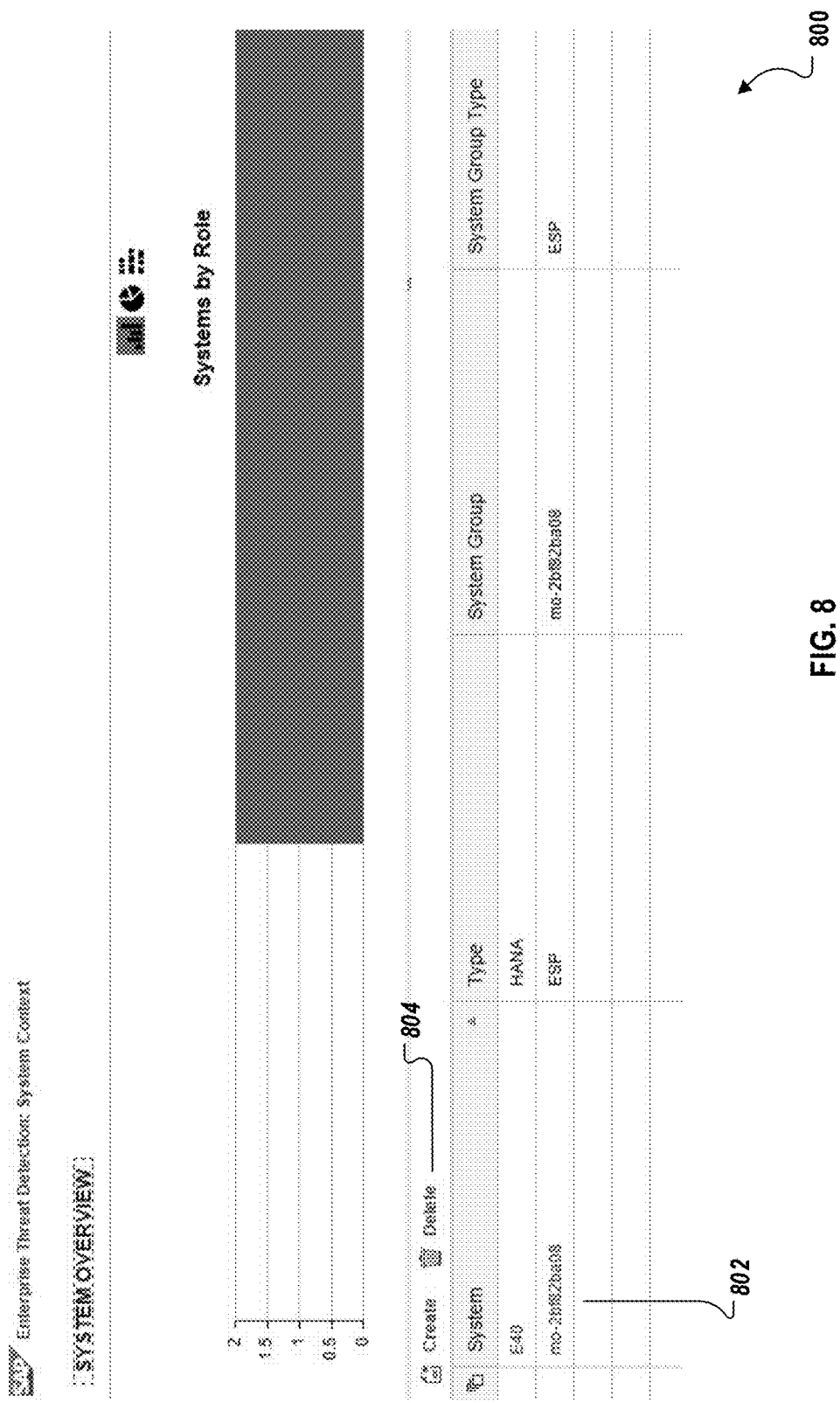
FIG. 8 is a screenshot of system GUI to maintain systems in the database, according to an implementation.

FIG. 8 is a screenshot of system GUI 800 to maintain systems in the database, according to an implementation. The illustrated systems 802 (and some of the associated system information described in FIG. 9) are the result of filtering on systems having a location maintained. The system GUI 800 allows users to, for example, add or delete systems (804). Selecting a system link (for example, system "E40") in the existing systems 802 navigates a user to a system details GUI.

Figure 9:
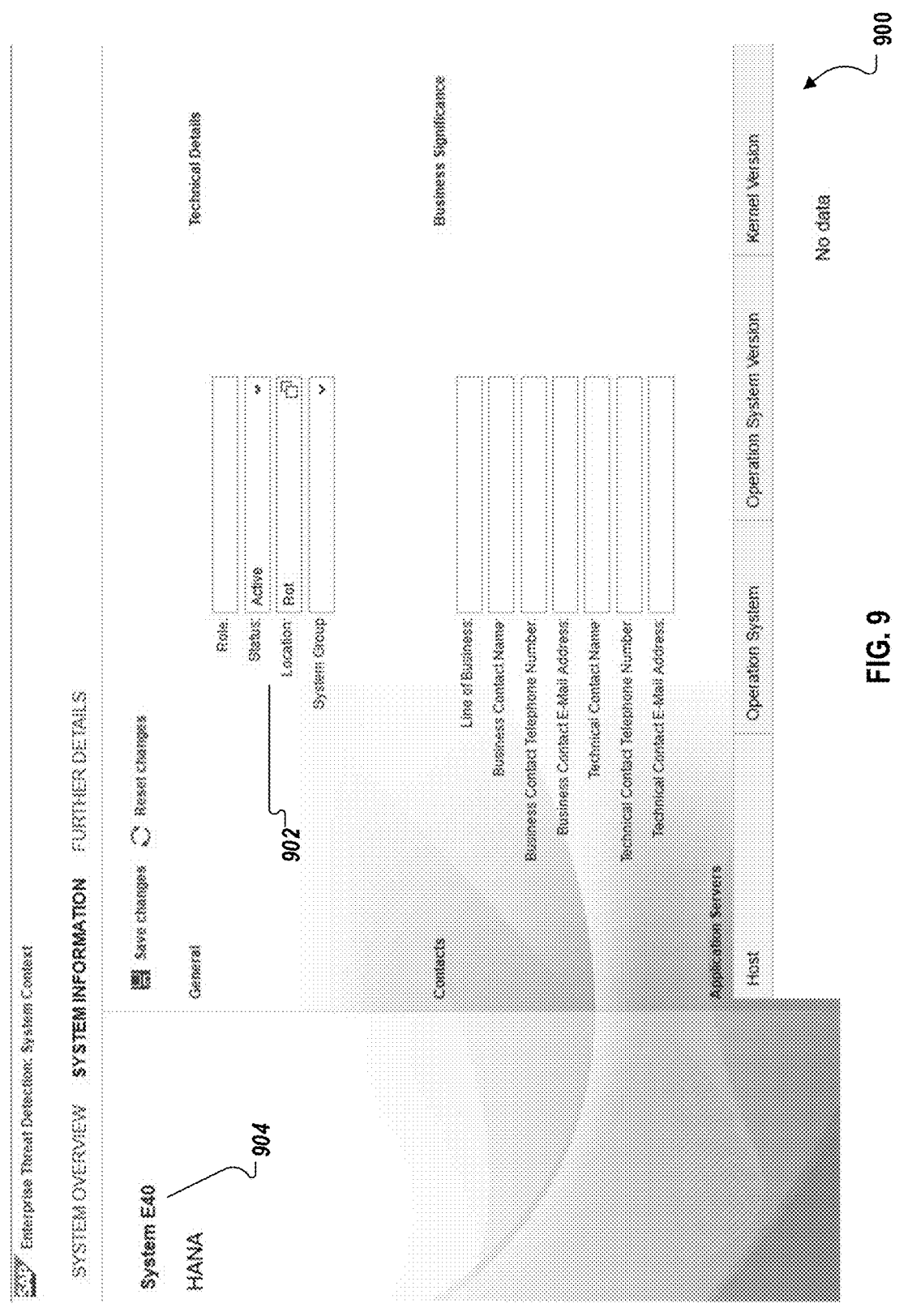

FIG. 9 is a screenshot of a system details GUI 900 used to maintain details of a particular system, according to an implementation. As illustrated, various GUI elements 902 are provided allow a user to specify details (including a location) of a selected subnet (here system "E40"). The example details are for illustration only. In other implementations, fewer, more, or other details can be configured by a user for a particular subnet. For example, additional details not displayed could include technical details (such as usage type, landscape, landscape description, database host, database type, and database version) and business significance (such as confidentiality, integrity system, integrity data, and availability).

Figure 10:
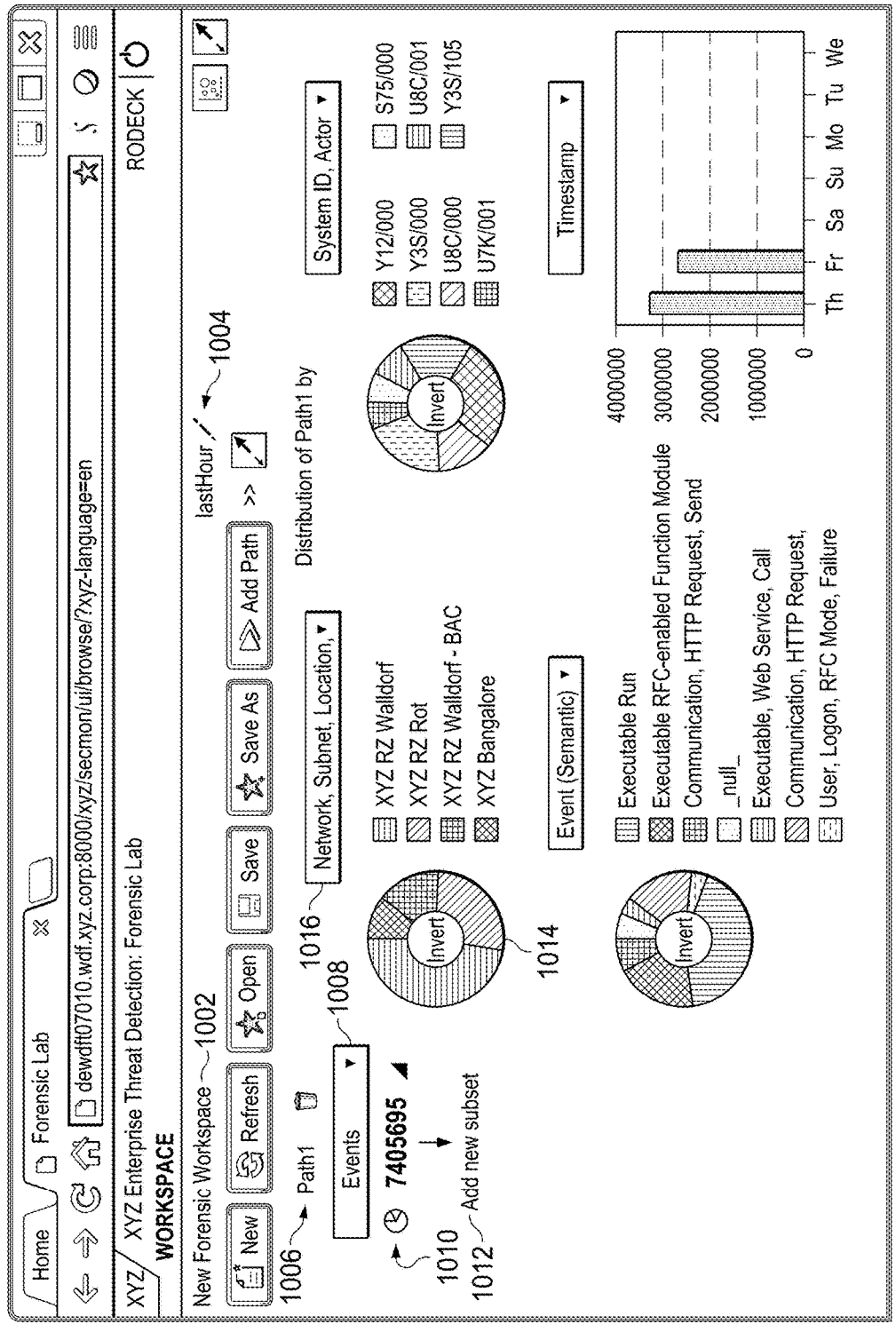
FIG. 10 illustrates a screenshot of an ETD forensic laboratory GUI used to analyze distribution of locations in event data, according to an implementation.

FIG. 10 illustrates a screenshot of an ETD forensic laboratory GUI 1000 used to analyze distribution of locations in event data, according to an implementation. On the left side, GUI 1000 permits the user to open a new forensic workspace 1002 according to a particular timeframe 1004 and for defined path 1006 (here "Path 1"). For the purposes of this disclosure, a path contains a series of filters. Starting with a "complete" set of log data (a particular chosen data source) for analysis, after creating a path, a particular subset of log data under analysis should remain. The application of a new filter in a path results in a new subset, which is necessarily at least equal to or smaller than a previous set/subset. Multiple logs can be analyzed in a single path. Associated with the path 1006, a selection 1008 can be made of particular data type (currently "Events" is shown as the selection). Other example data types that can be selected include "Health Check" (network PING checks are regularly performed to determine if all connected systems are still available or "Alert" (alerts generated by the ETD system based on configured criteria). An overall count 1010 of the number available events is displayed (here "7405695"). In typical implementations, the overall count 1010 is also selectable (small arrow to the lower right of the count number). By clicking the small arrow, a pulldown will be shown that allows the creation of a pattern, creation of a chart, displaying raw data of the current subset, etc. Selecting the "Add a new subset" link 1012 allows the user to add an additional filter.

On the right side of user interface 1000, user options to distribute various selectable dimensions of the set of log data. Each displayed chart is independent and provides a distributed view of the current subset of log data based on the selected path (for example chart 1014) according to a particular dimension 1016 (here "Network, Subnet, Location"). Note that a similar action can be made to create a distribution according to a dimension related to a system (for example, "System Location, Actor").

In some implementations, initial distributions (the number depending on, for example, display size, data types available, etc.) can be preselected based on any relevant criteria consistent with this disclosure. The user can change the initial, pre-selections to view other distributions. Changing the path will automatically change the selected distributions to reflect the updated subset of data. In some implementations, the right side of UI 1000 can be scrolled to permit addition of (using a user interface element—not illustrated) or visualization of other available distributions. In some implementations, the visualizations can be set to none to remove them from the display or removed (using a user interface element—not illustrated).

Figure 11:
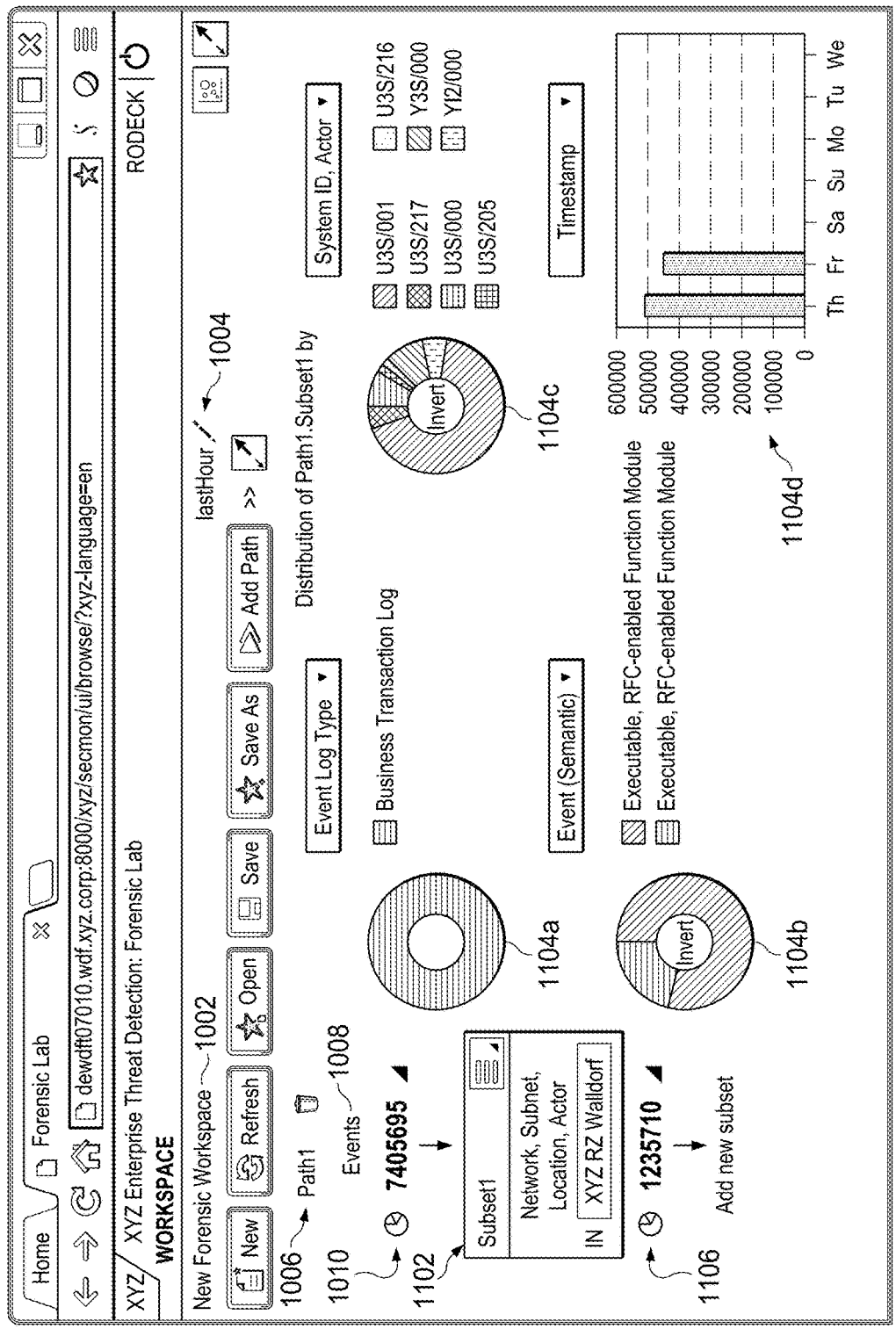
FIG. 11 illustrates a screenshot of an ETD forensic laboratory GUI used to analyze distribution of locations in event data, according to an implementation.

FIG. 11 illustrates a screenshot of an ETD forensic laboratory GUI 1100 used to analyze distribution of locations in event data, according to an implementation. In GUI 1100, the user has selected link 1012 described in FIG. 10 to add a filter to the path 1006. The illustrated filter is "Network, Subnet, Location, Actor" with location "SAP RZ Walldorf" with a new event count 1106 (here "1235710." Note that a similar action can be made to create a filter related to a system (for example "System Location, Actor" with location "SAP RZ Walldorf."). Charts similar to 1014 of FIG. 10 (here 1104a-1104d) allow distribution of the events filtered according to the current path 1006 specification (with the extra filter).

Figure 12:
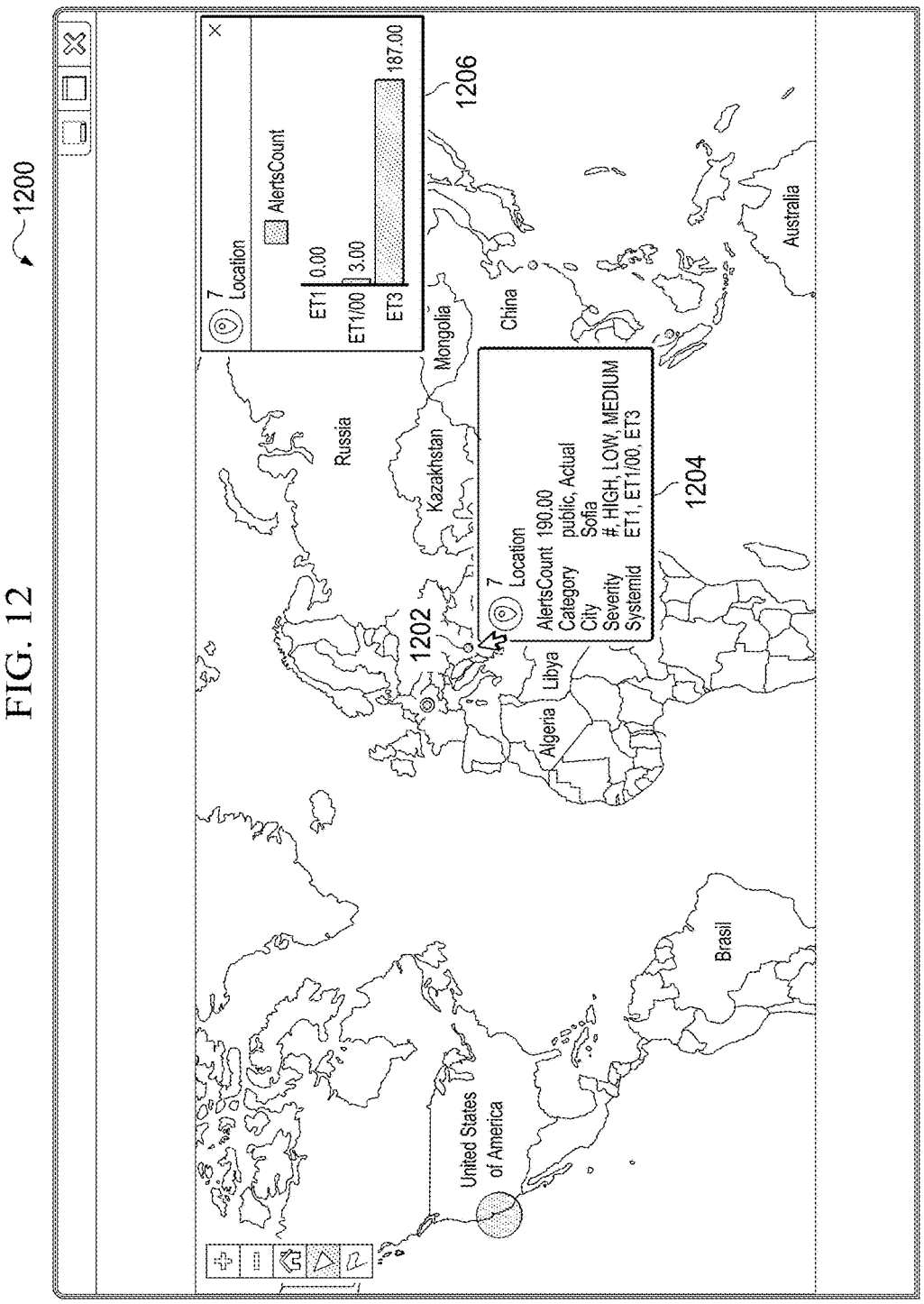
FIG. 12 illustrates a screenshot of a map illustrating an alert based on location, according to an implementation.

FIG. 12 illustrates a screenshot of a map 1200 illustrating an alert based on location, according to an implementation. Here, location 1202 (Sophia) is selected and pop-up dialogs 1204 and 1206 provide details of the location and alert, respectively.

Figure 13:
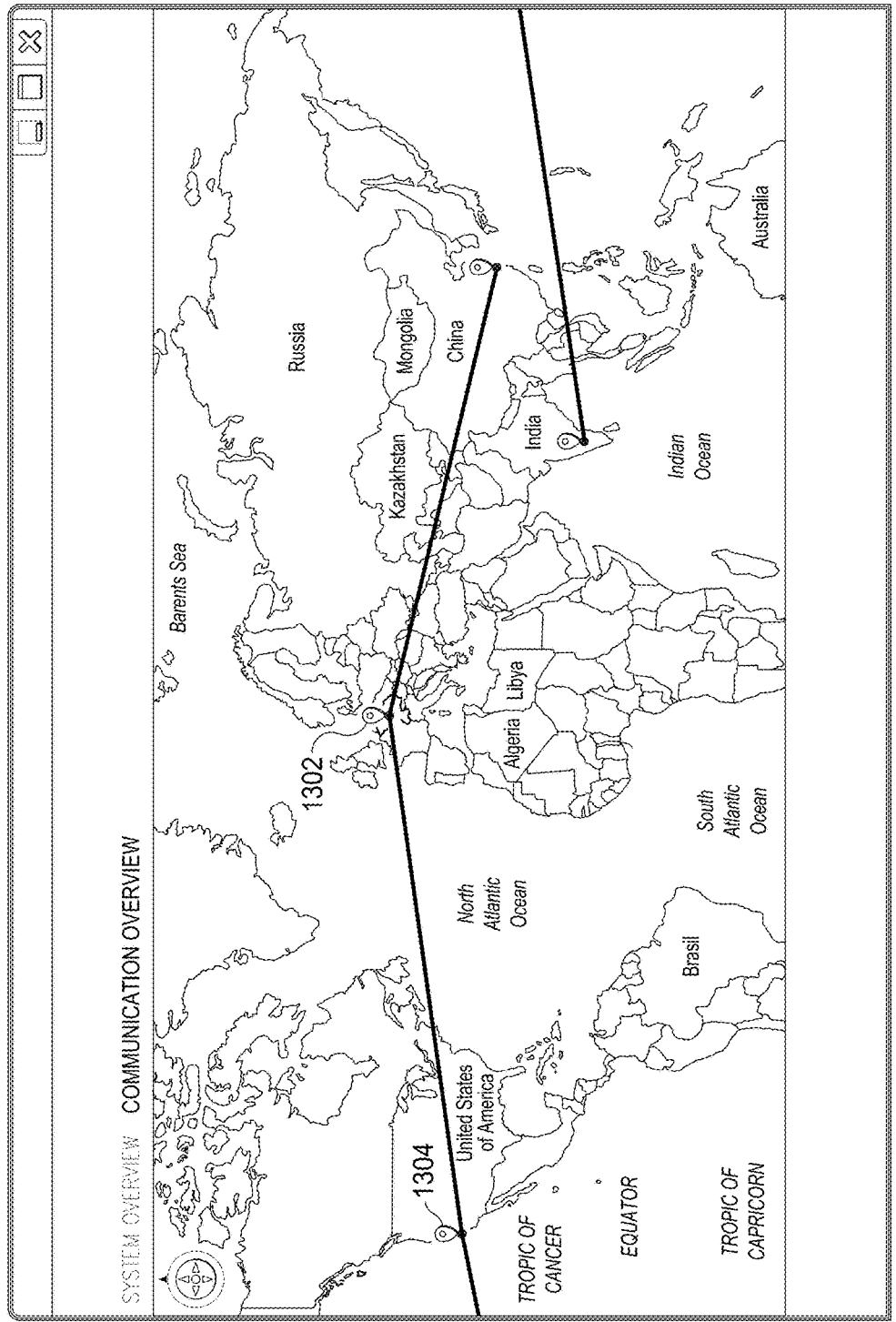
FIG. 13 illustrates a screenshot of a map display of log events raising an ETD location alert, according to an implementation.

FIG. 13 illustrates a screenshot of a map 1300 display of log events raising an ETD location alert, according to an implementation. Here, at 1302, a user logs on to a computing system using a client with a certain IP address which is located in Europe. A few seconds later, at 1304, the same user passes an access control system at a location in the United States. If the two events are correlated only with user information, a threat is not readily apparent. However, based on the subject matter of this disclosure, when geo-location is considered with the events, the events should be elevated for further analysis due to various possible use cases, some of which could be malicious. For example, the user could not realistically travel from Europe to the United States in a matter of seconds, so details around the European and United States logins should be analyzed in more detail. For example, as events, alerts, investigations, etc. can be identified based on locations, the illustrated scenario might indicate user password/data sharing or successful phishing attacks (where a user logs on from different locations with large distances in between the locations). The log events here can be analyzed based on the particular locations where the events happened, including, for example, communications (if any) between the different locations. A possible analysis with alerts raised in this scenario might include investigating the current network configuration compared to planned network configuration. This might show a misconfiguration, malicious modification, etc. to the network.

Figure 14:
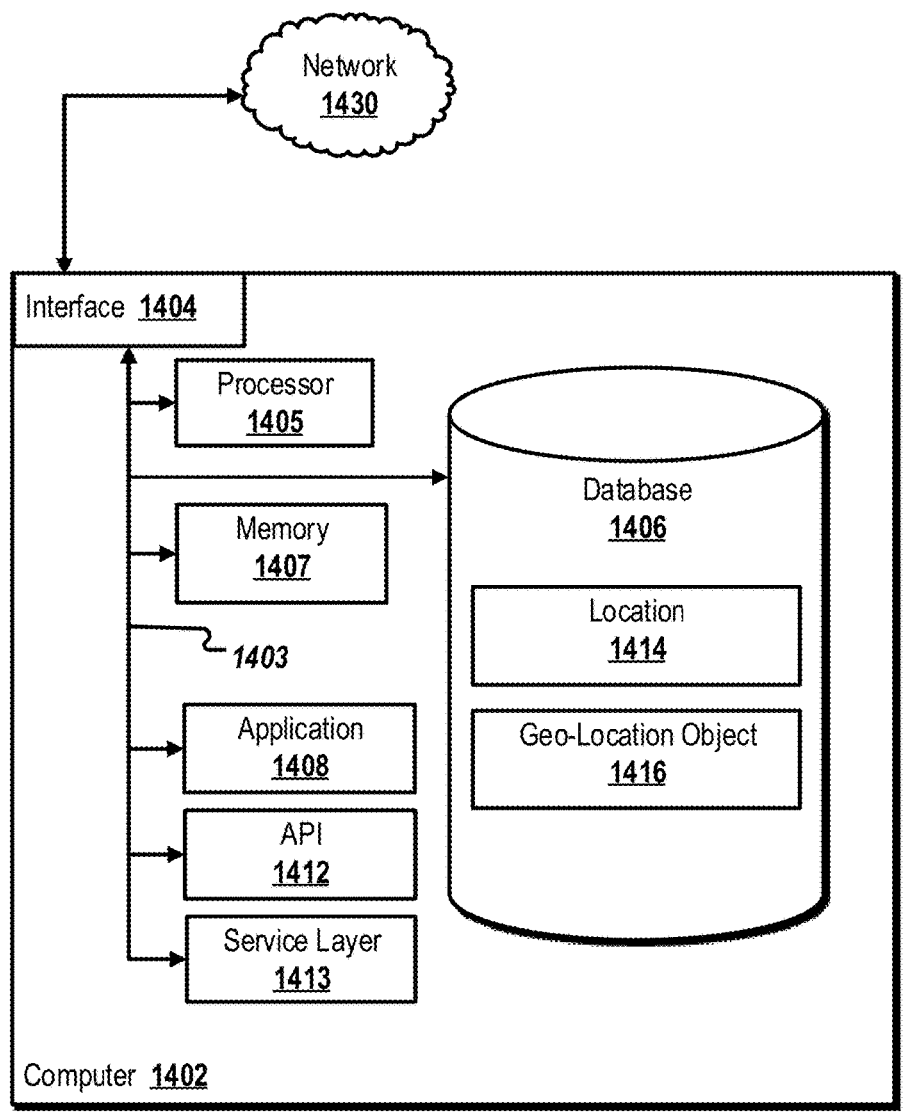
FIG. 14 is a block diagram of an exemplary computer system used to provide computational functionalities associated with described algorithms, methods, functions, processes, flows, and procedures as described in the instant disclosure, according to an implementation.

FIG. 14 is a block diagram of an exemplary computer system 1400 used to provide computational functionalities associated with described algorithms, methods, functions, processes, flows, and procedures as described in the instant disclosure, according to an implementation. The illustrated computer 1402 is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer 1402 may comprise a computer that includes an input device, such as a keypad, keyboard, touch screen, or other device that can accept user information, and an output device that conveys information associated with the operation of the computer 1402, including digital data, visual, or audio information (or a combination of information), or a GUI.

The computer 1402 can serve in a role as a client, network component, a server, a database or other persistency, or any other component (or a combination of roles) of a computer system for performing the subject matter described in the instant disclosure. The illustrated computer 1402 is communicably coupled with a network 1430. In some implementations, one or more components of the computer 1402 may be configured to operate within environments, including cloud-computing-based, local, global, or other environment (or a combination of environments).

At a high level, the computer 1402 is an electronic computing device operable to receive, transmit, process, store, or manage data and information associated with the described subject matter. According to some implementations, the computer 1402 may also include or be communicably coupled with an application server, e-mail server, web server, caching server, streaming data server, business intelligence (BI) server, or other server (or a combination of servers).

The computer 1402 can receive requests over network 1430 from a client application (for example, executing on another computer 1402) and responding to the received requests by processing the said requests in an appropriate software application. In addition, requests may also be sent to the computer 1402 from internal users (for example, from a command console or by other appropriate access method), external or third-parties, other automated applications, as well as any other appropriate entities, individuals, systems, or computers.

Each of the components of the computer 1402 can communicate using a system bus 1403. In some implementations, any or all of the components of the computer 1402, both hardware or software (or a combination of hardware and software), may interface with each other or the interface 1404 (or a combination of both) over the system bus 1403 using an application programming interface (API) 1412 or a service layer 1413 (or a combination of the API 1412 and service layer 1413). The API 1412 may include specifications for routines, data structures, and object classes. The API 1412 may be either computer-language independent or dependent and refer to a complete interface, a single function, or even a set of APIs. The service layer 1413 provides software services to the computer 1402 or other components (whether or not illustrated) that are communicably coupled to the computer 1402. The functionality of the computer 1402 may be accessible for all service consumers using this service layer. Software services, such as those provided by the service layer 1413, provide reusable, defined business functionalities through a defined interface. For example, the interface may be software written in JAVA, C++, or other suitable language providing data in extensible markup language (XML) format or other suitable format. While illustrated as an integrated component of the computer 1402, alternative implementations may illustrate the API 1412 or the service layer 1413 as stand-alone components in relation to other components of the computer 1402 or other components (whether or not illustrated) that are communicably coupled to the computer 1402. Moreover, any or all parts of the API 1412 or the service layer 1413 may be implemented as child or sub-modules of another software module, enterprise application, or hardware module without departing from the scope of this disclosure.

The computer 1402 includes an interface 1404. Although illustrated as a single interface 1404 in FIG. 14, two or more interfaces 1404 may be used according to particular needs, desires, or particular implementations of the computer 1402. The interface 1404 is used by the computer 1402 for communicating with other systems in a distributed environment that are connected to the network 1430 (whether illustrated or not). Generally, the interface 1404 comprises logic encoded in software or hardware (or a combination of software and hardware) and operable to communicate with the network 1430. More specifically, the interface 1404 may comprise software supporting one or more communication protocols associated with communications such that the network 1430 or interface's hardware is operable to communicate physical signals within and outside of the illustrated computer 1402.

The computer 1402 includes a processor 1405. Although illustrated as a single processor 1405 in FIG. 14, two or more processors may be used according to particular needs, desires, or particular implementations of the computer 1402. Generally, the processor 1405 executes instructions and manipulates data to perform the operations of the computer 1402 and any algorithms, methods, functions, processes, flows, and procedures as described in the instant disclosure.

The computer 1402 also includes a database 1406 that can hold data for the computer 1402 or other components (or a combination of both) that can be connected to the network 1430 (whether illustrated or not). For example, database 1406 can be an in-memory, conventional, or other type of database storing data consistent with this disclosure. In some implementations, database 1406 can be a combination of two or more different database types (for example, a hybrid in-memory and conventional database) according to particular needs, desires, or particular implementations of the computer 1402 and the described functionality. Although illustrated as a single database 1406 in FIG. 14, two or more databases (of the same or combination of types) can be used according to particular needs, desires, or particular implementations of the computer 1402 and the described functionality. While database 1406 is illustrated as an integral component of the computer 1402, in alternative implementations, database 1406 can be external to the computer 1402. As illustrated, the database 1406 holds both location 1414 and geo-location object 1416 data as described above.

The computer 1402 also includes a memory 1407 that can hold data for the computer 1402 or other components (or a combination of both) that can be connected to the network 1430 (whether illustrated or not). For example, memory 1407 can be random access memory (RAM), read-only memory (ROM), optical, magnetic, and the like storing data consistent with this disclosure. In some implementations, memory 1407 can be a combination of two or more different types of memory (for example, a combination of RAM and magnetic storage) according to particular needs, desires, or particular implementations of the computer 1402 and the described functionality. Although illustrated as a single memory 1407 in FIG. 14, two or more memories 1407 (of the same or combination of types) can be used according to particular needs, desires, or particular implementations of the computer 1402 and the described functionality. While memory 1407 is illustrated as an integral component of the computer 1402, in alternative implementations, memory 1407 can be external to the computer 1402.

The application 1408 is an algorithmic software engine providing functionality according to particular needs, desires, or particular implementations of the computer 1402, particularly with respect to functionality described in this disclosure. For example, application 1408 can serve as one or more components, modules, applications, etc. Further, although illustrated as a single application 1408, the application 1408 may be implemented as multiple applications 1407 on the computer 1402. In addition, although illustrated as integral to the computer 1402, in alternative implementations, the application 1408 can be external to the computer 1402.

There may be any number of computers 1402 associated with, or external to, a computer system containing computer 1402, each computer 1402 communicating over network 1430. Further, the term "client," "user," and other appropriate terminology may be used interchangeably as appropriate without departing from the scope of this disclosure. Moreover, this disclosure contemplates that many users may use one computer 1402, or that one user may use multiple computers 1402.

Described implementations of the subject matter can include one or more features, alone or in combination.

For example, in a first implementation, a computer-implemented method, comprising: receiving subnet information and location information from a database into a smart data streaming engine (SDS), wherein a particular subnet of the subnet information is associated with a particular location of the location information by a globally unique location ID value; normalizing received log event data in the SDS as normalized log event data; enriching the normalized log event data with subnet and location information as enriched log event data; writing the enriched log event data into a log event persistence in the database; and using a subnet ID value retrieved from an enriched log event of the enriched log event data by an enterprise threat detection (ETD) system to determine a location associated with the enriched log event using the location ID value associated with the subnet ID value.

The foregoing and other described implementations can each optionally include one or more of the following features:

A first feature, combinable with any of the following features, wherein the subnet information and the location information is maintained in the database.

A second feature, combinable with any of the previous or following features, wherein system information is maintained in the database, and wherein a particular system of the system information is associated with a particular location of the location information by a particular globally unique location ID value.

A third feature, combinable with any of the previous or following features, comprising: reading the subnet information and the location information from the subnet-location persistence; and writing the subnet information and the location information into a subnet-location cache of the SDS.

A fourth feature, combinable with any of the previous or following features, wherein the subnet information and the location information is read from the subnet-location persistence and written to the subnet-location cache using an SDS database in adapter coupling the database and the SDS.

A fifth feature, combinable with any of the previous or following features, wherein the enriched log event data is written to the log event persistence using an SDS database out adapter coupling the SDS and the database.

A sixth feature, combinable with any of the previous or following features, comprising enriching the normalized log event data with a determined subnet ID value.

In a second implementation, a non-transitory, computer-readable medium storing one or more instructions executable by a computer system to perform operations comprising: receiving subnet information and location information from a database into a smart data streaming engine (SDS), wherein a particular subnet of the subnet information is associated with a particular location of the location information by a globally unique location ID value; normalizing received log event data in the SDS as normalized log event data; enriching the normalized log event data with subnet and location information as enriched log event data; writing the enriched log event data into a log event persistence in the database; and using a subnet ID value retrieved from an enriched log event of the enriched log event data by an enterprise threat detection (ETD) system to determine a location associated with the enriched log event using the location ID value associated with the subnet ID value.

The foregoing and other described implementations can each optionally include one or more of the following features:

A first feature, combinable with any of the following features, wherein the subnet information and the location information is maintained in the database.

A second feature, combinable with any of the previous or following features, wherein system information is maintained in the database, and wherein a particular system of the system information is associated with a particular location of the location information by a particular globally unique location ID value.

A third feature, combinable with any of the previous or following features, comprising one or more instructions to: read the subnet information and the location information from the subnet-location persistence; and write the subnet information and the location information into a subnet-location cache of the SDS.

A fourth feature, combinable with any of the previous or following features, wherein the subnet information and the location information is read from the subnet-location persistence and written to the subnet-location cache using an SDS database in adapter coupling the database and the SDS.

A fifth feature, combinable with any of the previous or following features, wherein the enriched log event data is written to the log event persistence using an SDS database out adapter coupling the SDS and the database.

A sixth feature, combinable with any of the previous or following features, comprising one or more instructions to enrich the normalized log event data with a determined subnet ID value.

In a third implementation, a computer-implemented system, comprising: a computer memory; and a hardware processor interoperably coupled with the computer memory and configured to perform operations comprising: receiving subnet information and location information from a database into a smart data streaming engine (SDS), wherein a particular subnet of the subnet information is associated with a particular location of the location information by a globally unique location ID value; normalizing received log event data in the SDS as normalized log event data; enriching the normalized log event data with subnet and location information as enriched log event data; writing the enriched log event data into a log event persistence in the database; and using a subnet ID value retrieved from an enriched log event of the enriched log event data by an enterprise threat detection (ETD) system to determine a location associated with the enriched log event using the location ID value associated with the subnet ID value.

The foregoing and other described implementations can each optionally include one or more of the following features:

A first feature, combinable with any of the following features, wherein the subnet information and the location information is maintained in the database.

A second feature, combinable with any of the previous or following features, wherein system information is maintained in the database, and wherein a particular system of the system information is associated with a particular location of the location information by a particular globally unique location ID value.

A third feature, combinable with any of the previous or following features, configured to: read the subnet information and the location information from the subnet-location persistence; and write the subnet information and the location information into a subnet-location cache of the SDS.

A fourth feature, combinable with any of the previous or following features, wherein the subnet information and the location information is read from the subnet-location persistence and written to the subnet-location cache using an SDS database in adapter coupling the database and the SDS.

A fifth feature, combinable with any of the previous or following features, wherein the enriched log event data is written to the log event persistence using an SDS database out adapter coupling the SDS and the database.

A sixth feature, combinable with any of the previous or following features, configured to enrich the normalized log event data with a determined subnet ID value.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, that is, one or more modules of computer program instructions encoded on a tangible, non-transitory, computer-readable computer-storage medium for execution by, or to control the operation of, data processing apparatus. Alternatively or in addition, the program instructions can be encoded on an artificially generated propagated signal, for example, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data may be less than 1 ms, less than 1 sec., less than 5 secs., etc. While the requested data need not be displayed (or initiated for display) instantaneously, it is displayed (or initiated for display) without any intentional delay, taking into account processing limitations of a described computing system and time required to, for example, gather, accurately measure, analyze, process, store, and/or transmit the data.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be or further include special purpose logic circuitry, for example, a central processing unit (CPU), an FPGA (field programmable gate array), or an ASIC (application-specific integrated circuit). In some implementations, the data processing apparatus or special purpose logic circuitry (or a combination of the data processing apparatus or special purpose logic circuitry) may be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, IOS, or any other suitable conventional operating system.

A computer program, which may also be referred to or described as a program, software, a software application, a module, a software module, a script, or code can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, for example, a CPU, an FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM), or both. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable storage device, for example, a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, for example, erasable programmable read-only memory (EPROM), electrically erasable programmable read-only memory (EEPROM), and flash memory devices; magnetic disks, for example, internal hard disks or removable disks; magneto-optical disks; and CD-ROM, DVD+/–R, DVD-RAM, and DVD-ROM disks. The memory may store various objects or data, including caches, classes, frameworks, applications, backup data, jobs, web pages, web page templates, database tables, repositories storing dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with this disclosure), all or a portion of the Internet, or any other communication system or systems at one or more locations (or a combination of communication networks). The network may communicate with, for example, Internet Protocol (IP) packets, Frame Relay frames, Asynchronous Transfer Mode (ATM) cells, voice, video, data, or other suitable information (or a combination of communication types) between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, both hardware or software (or a combination of hardware and software), may interface with each other or the interface using an application programming interface (API) or a service layer (or a combination of API and service layer). The API may include specifications for routines, data structures, and object classes. The API may be either computer language independent or dependent and refer to a complete interface, a single function, or even a set of APIs. The service layer provides software services to the computing system. The functionality of the various components of the computing system may be accessible for all service consumers using this service layer. Software services provide reusable, defined business functionalities through a defined interface. For example, the interface may be software written in JAVA, C++, or other suitable language providing data in extensible markup language (XML) format or other suitable format. The API or service layer (or a combination of the API and the service layer) may be an integral or a stand-alone component in relation to other components of the computing system. Moreover, any or all parts of the service layer may be implemented as child or sub-modules of another software module, enterprise application, or hardware module without departing from the scope of this disclosure.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although features may be described above as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the implementations described above should not be understood as requiring such separation or integration in all implementations, and it should be understood that the described program components and systems can generally be integrated together in a single software product or packaged into multiple software products.

Accordingly, the above description of example implementations does not define or constrain this disclosure. Other changes, substitutions, and alterations are also possible without departing from the spirit and scope of this disclosure.

Furthermore, any claimed implementation below is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method, comprising:
   receiving subnet information and location information from a database into a smart data streaming engine (SDS) subnet-location cache, wherein a particular subnet of the subnet information is associated with a particular location of the location information by a globally unique location ID value, and wherein the information is stored in the subnet-location cache in the form of a dictionary table and a vector for fast data enrichment;
   receiving log event data in the SDS;
   normalizing the log event data in the SDS as normalized log event data;
   enriching the normalized log event data with the subnet information and the location information as enriched log event data;
   writing the enriched log event data into a log event persistence in the database; and
   using a subnet ID value retrieved from an enriched log event of the enriched log event data by an enterprise threat detection (ETD) system to determine a location associated with the enriched log event using the location ID value associated with the subnet ID value.

2. The computer-implemented method of claim 1, wherein the subnet information and the location information is maintained in the database.

3. The computer-implemented method of claim 2, wherein system information is maintained in the database, and wherein a particular system of the system information is associated with a particular location of the location information by a particular globally unique location ID value.

4. The computer-implemented method of claim 1, comprising:
   reading the subnet information and the location information from the database; and
   writing the subnet information and the location information into the subnet-location cache of the SDS.

5. The computer-implemented method of claim 4, wherein the subnet information and the location information is read from the subnet-location persistence and written to the subnet-location cache using an SDS database in adapter coupling the database and the SDS.

6. The computer-implemented method of claim 1, wherein the enriched log event data is written to the log event persistence using an SDS database out adapter coupling the SDS and the database.

7. The computer-implemented method of claim 1, comprising enriching the normalized log event data with a determined subnet ID value.

8. A non-transitory, computer-readable medium storing one or more instructions executable by a computer system to perform operations comprising:
   receiving subnet information and location information from a database into a smart data streaming engine (SDS) subnet-location cache, wherein a particular subnet of the subnet information is associated with a particular location of the location information by a globally unique location ID value, and wherein the information is stored in the subnet-location cache in the form of a dictionary table and a vector for fast data enrichment;
   receiving log event data in the SDS;
   normalizing the log event data in the SDS as normalized log event data;
   enriching the normalized log event data with the subnet information and the location information as enriched log event data;
   writing the enriched log event data into a log event persistence in the database; and
   using a subnet ID value retrieved from an enriched log event of the enriched log event data by an enterprise threat detection (ETD) system to determine a location associated with the enriched log event using the location ID value associated with the subnet ID value.

9. The non-transitory, computer-readable medium of claim 8, wherein the subnet information and the location information is maintained in the database.

10. The non-transitory, computer-readable medium of claim 9, wherein system information is maintained in the database, and wherein a particular system of the system information is associated with a particular location of the location information by a particular globally unique location ID value.

11. The non-transitory, computer-readable medium of claim 8, comprising one or more instructions to:
   read the subnet information and the location information from the database; and
   write the subnet information and the location information into the subnet-location cache of the SDS.

12. The non-transitory, computer-readable medium of claim 11, wherein the subnet information and the location information is read from the subnet-location persistence and written to the subnet-location cache using an SDS database in adapter coupling the database and the SDS.

13. The non-transitory, computer-readable medium of claim 8, wherein the enriched log event data is written to the log event persistence using an SDS database out adapter coupling the SDS and the database.

14. The non-transitory, computer-readable medium of claim 8, comprising one or more instructions to enrich the normalized log event data is enriched with a determined subnet ID value.

15. A computer-implemented system, comprising:
   a computer memory; and
   a hardware processor interoperably coupled with the computer memory and configured to perform operations comprising:
      receiving subnet information and location information from a database into a smart data streaming engine (SDS) subnet-location cache, wherein a particular subnet of the subnet information is associated with a particular location of the location information by a globally unique location ID value, and wherein the information is stored in the subnet-location cache in the form of a dictionary table and a vector for fast data enrichment;
      receiving log event data in the SDS;
      normalizing the log event data in the SDS as normalized log event data;

enriching the normalized log event data with the subnet information and the location information as enriched log event data;

writing the enriched log event data into a log event persistence in the database; and using a subnet ID value retrieved from an enriched log event of the enriched log event data by an enterprise threat detection (ETD) system to determine a location associated with the enriched log event using the location ID value associated with the subnet ID value.

16. The computer-implemented system of claim 15, wherein the subnet information and the location information is maintained in the database.

17. The computer-implemented system of claim 16, wherein system information is maintained in the database, and wherein a particular system of the system information is associated with a particular location of the location information by a particular globally unique location ID value.

18. The computer-implemented system of claim 15, configured to:

read the subnet information and the location information from the database; and write the subnet information and the location information into the subnet-location cache of the SDS.

19. The computer-implemented system of claim 18, wherein the subnet information and the location information is read from the subnet-location persistence and written to the subnet-location cache using an SDS database in adapter coupling the database and the SDS, and wherein the enriched log event data is written to the log event persistence using an SDS database out adapter coupling the SDS and the database.

20. The computer-implemented system of claim 15, configured to enrich the normalized log event data is enriched with a determined subnet ID value.

* * * * *